US010949632B2

(12) United States Patent
Werner et al.

(10) Patent No.: US 10,949,632 B2
(45) Date of Patent: Mar. 16, 2021

(54) CABLE PLUGGING GUIDANCE FACILITY FOR A NETWORK

(71) Applicant: INTERNATIONAL BUSINESS MACHINES CORPORATION, Armonk, NY (US)

(72) Inventors: John S. Werner, Fishkill, NY (US); Daniel J. Kearney, Ulster Park, NY (US); Matteo Cocchini, Long Island City, NY (US); Budy D. Notohardjono, Poughkeepsie, NY (US); Arkadiy O. Tsfasman, Wappingers Falls, NY (US); Robert K. Mullady, Highland, NY (US); Noah Singer, New City, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 179 days.

(21) Appl. No.: 15/967,798

(22) Filed: May 1, 2018

(65) Prior Publication Data

US 2019/0340399 A1 Nov. 7, 2019

(51) Int. Cl.
  *G06K 7/08* (2006.01)
  *G06K 7/10* (2006.01)
(52) U.S. Cl.
  CPC .............................. *G06K 7/10366* (2013.01)
(58) Field of Classification Search
  CPC .................................................. G06K 7/10366
  USPC ....................................................... 235/451
  See application file for complete search history.

(56) References Cited

U.S. PATENT DOCUMENTS

| 7,307,408 B2 | 12/2007 | Porcu et al. |
| 7,605,707 B2 | 10/2009 | German et al. |
| 8,643,476 B2 | 2/2014 | Pinn et al. |
| 8,674,823 B1 | 3/2014 | Contario et al. |
| 10,049,276 B1 | 8/2018 | Harper et al. |

(Continued)

FOREIGN PATENT DOCUMENTS

| CA | 3015149 | * 8/2018 | ............. H04L 12/24 |
| DE | 102009044140 A1 | 4/2010 | |

OTHER PUBLICATIONS

Mel, et al., "The NIST Definition of Cloud Computing," National Institute of Standards and Technology, Information Technology Laboratory, Special Publication 800-145, Sep. 2011, (pp. 1-7).

(Continued)

*Primary Examiner* — Karl D Frech
(74) *Attorney, Agent, or Firm* — Teddi Maranzano, Esq.; Kevin P. Radigan, Esq.; Heslin Rothenberg Farley & Mesiti P.C.

(57) ABSTRACT

Methods, systems, and computer program products are provided for facilitating cable plugging in a network by receiving, from a scanner associated with the network, wirelessly read connector identifying information from a tag accompanying a cable connector at one end of a cable to be plugged in the network, and using, by a processor, the connector identifying information to ascertain, from a database, applicable cable rules guidance for where to properly plug the cable connector in the network. Based on ascertaining the guidance, one or more indicators associated with one or more plug locations in the network are illuminated to assist in properly plugging the cable connector in the network.

20 Claims, 11 Drawing Sheets

(56) References Cited

U.S. PATENT DOCUMENTS

| | | | |
|---|---|---|---|
| 2004/0065741 A1* | 4/2004 | Reddersen | G06F 3/002 235/462.45 |
| 2006/0277324 A1 | 12/2006 | Aldereguia et al. | |
| 2007/0247284 A1 | 10/2007 | Martin et al. | |
| 2008/0065874 A1 | 3/2008 | Geissler et al. | |
| 2011/0012727 A1 | 1/2011 | Pance et al. | |
| 2012/0045928 A1* | 2/2012 | Caveney | H04Q 1/138 439/488 |
| 2012/0063501 A1 | 3/2012 | Aguren | |
| 2013/0181816 A1 | 7/2013 | Carlson, Jr. et al. | |
| 2013/0223684 A1 | 8/2013 | Townend et al. | |
| 2014/0018697 A1 | 1/2014 | Allison | |
| 2014/0111346 A1 | 4/2014 | Pinn et al. | |
| 2017/0018274 A1 | 1/2017 | German et al. | |
| 2017/0117669 A1 | 4/2017 | Brodsky et al. | |
| 2017/0315167 A1 | 11/2017 | Bai et al. | |
| 2017/0367212 A1 | 12/2017 | Moore et al. | |
| 2018/0006894 A1 | 1/2018 | Power et al. | |

OTHER PUBLICATIONS

International Business Machines Corporation (IBM), "z/Architecture Principles of Operation," IBM® Publication No. SA22-7832-10, Eleventh Edition, Mar. 2015, (pp. 1-1732).

International Business Machines Corporation (IBM), "Power ISA™ Version 2.07B," Apr. 9, 2015, (pp. 1-1527).

Hong, et al., "Management Enabling the Future Internet for Changing Business and New Computing Services," 12th Asia-Pacific Network Operations and Management Symposium, APNOMS 2009, Jeju South Korea, Sep. 2009 (pp. 1-568).

Miseikis, et al., "3D Vision Guided Robotic Charging Station for Electric and Plug-in Hybrid Vehicles," arXiv: 1703.05381v1, dated Mar. 15, 2017 (pp. 1-6).

Werner et al., "Guided Cable Plugging in a Network", U.S. Appl. No. 15/967,781, filed May 1, 2018 (51 pages).

Werner et al., "List of IBM Patents and Patent Applications Treated as Related", U.S. Appl. No. 15/967,798, filed May 1, 2018, dated May 1, 2018, (2 pages).

* cited by examiner

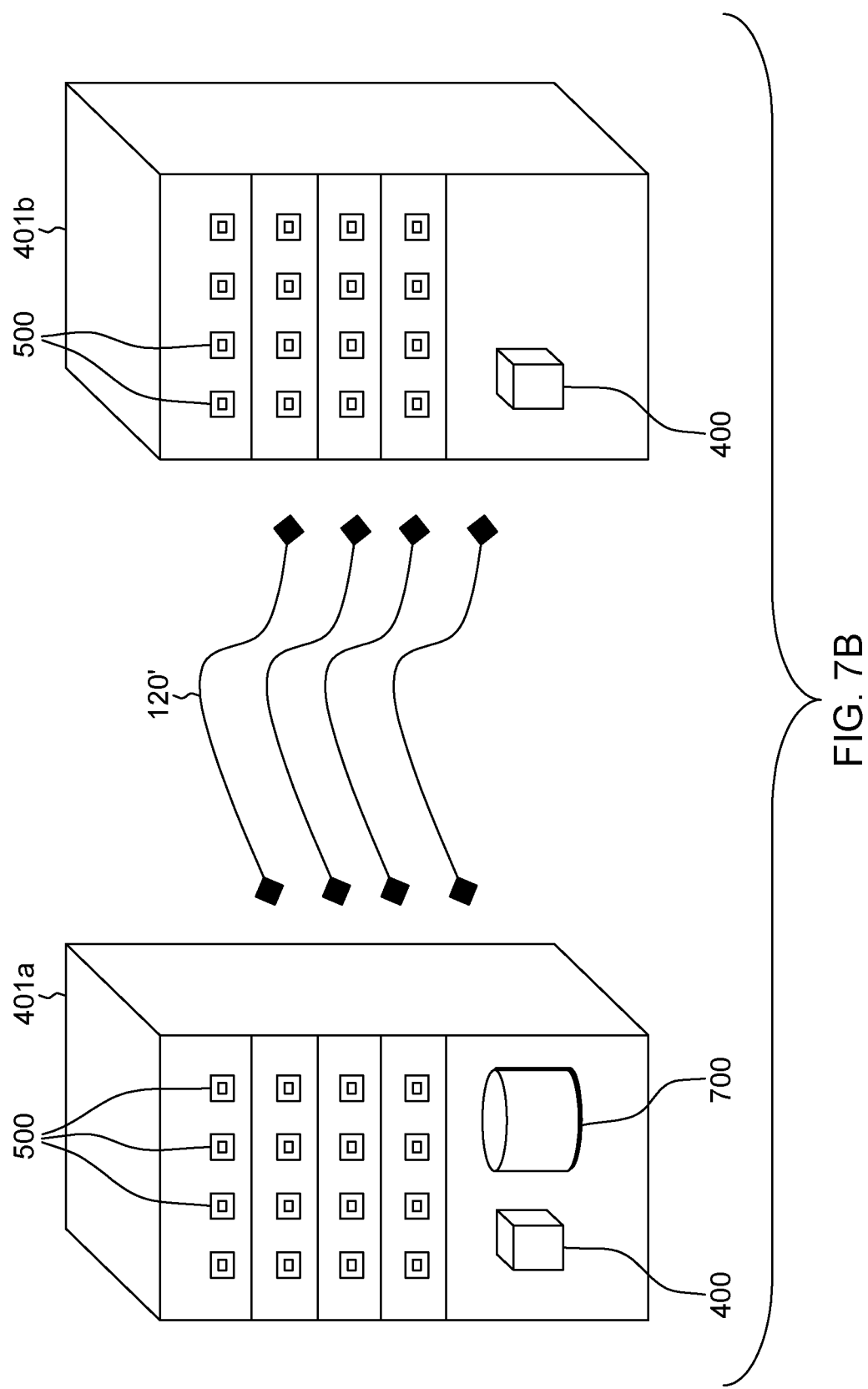

CABLE PLUGGING GUIDANCE FACILITY FOR A NETWORK

BACKGROUND

In system networking, such as computer networking, situations exist where a user (or operator) may be required to plug a large number of cables. For instance, a server network may contain tens or even hundreds, or more, cables to be connected. Even if a user knows where to plug a particular cable, there may be a number of similar cables that have been plugged at a first cable end which would need to be traced back from a second cable end in order to ascertain which particular cable a user may be holding to determine where to plug the second end. Further, if unplugging a particular cable, it may be difficult to know where the other end of the cable is plugged within the computer network. Additionally, situations may exist where a cable is long enough that a user plugging one end of the cable may not be able to see the other end. For instance, cables may span between front and back sides of a computer rack, or between computer racks, or across a data center, or even across separate rooms of a facility, etc., each of which may make tracing a particular cable more difficult and time consuming.

SUMMARY

Certain shortcomings of the prior art are overcome and additional advantages are provided through the provision, in one or more aspects, of a method of facilitating cable plugging in a network. The method includes receiving from a scanner associated with the network, wirelessly read connector identifying information from a tag accompanying a cable connector at one end of a cable to be plugged in the network, and using, by a processor, the connector identifying information to ascertain, from a database, applicable cable rules guidance for where to properly plug the cable connector in the network. Further, the method includes, based on the guidance, illuminating one or more indicators associated with one or more plug locations in the network to assist in properly plugging the cable connector in the network.

In another aspect, a system of facilitating cable plugging in a network is provided. The system includes a memory, and a processor communicatively coupled to the memory. The system performs a method, which includes receiving, from a scanner associated with the network, wirelessly read connector identifying information from a tag accompanying a cable connector at one end of a cable to be plugged in the network, and using the connector identifying information to ascertain, from a database, applicable cable rules guidance for where to properly plug the cable connector in the network. Further, the method includes, based on ascertaining the guidance, illuminating one or more indicators associated with one or more plug locations in the network to assist in properly plugging the cable connector in the network.

In a further aspect, a computer program product is provided for facilitating cable plugging in a network. The computer program product includes a computer-readable storage medium having program instructions embodied therewith. The program instructions are executable by a processor to cause the processor to: receive, from a scanner associated with the network, wirelessly read connector identifying information from a tag accompanying a cable connector at one end of a cable to be plugged in the network, and use the connector identifying information to ascertain, from a database, applicable cable rules guidance for where to properly plug the cable connector in the network. Based on ascertaining the guidance, one or more indicators associated with one or more plug locations within the network are illuminated to assist in properly plugging the cable connector in the network.

Additional features and advantages are realized through the techniques of the present invention. Other embodiments and aspects of the invention are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

FIG. 7B depicts another embodiment of a network with multiple components and a cable plugging guidance system incorporated therein, in accordance with one or more aspects of the present invention;

DETAILED DESCRIPTION

Figure 1:
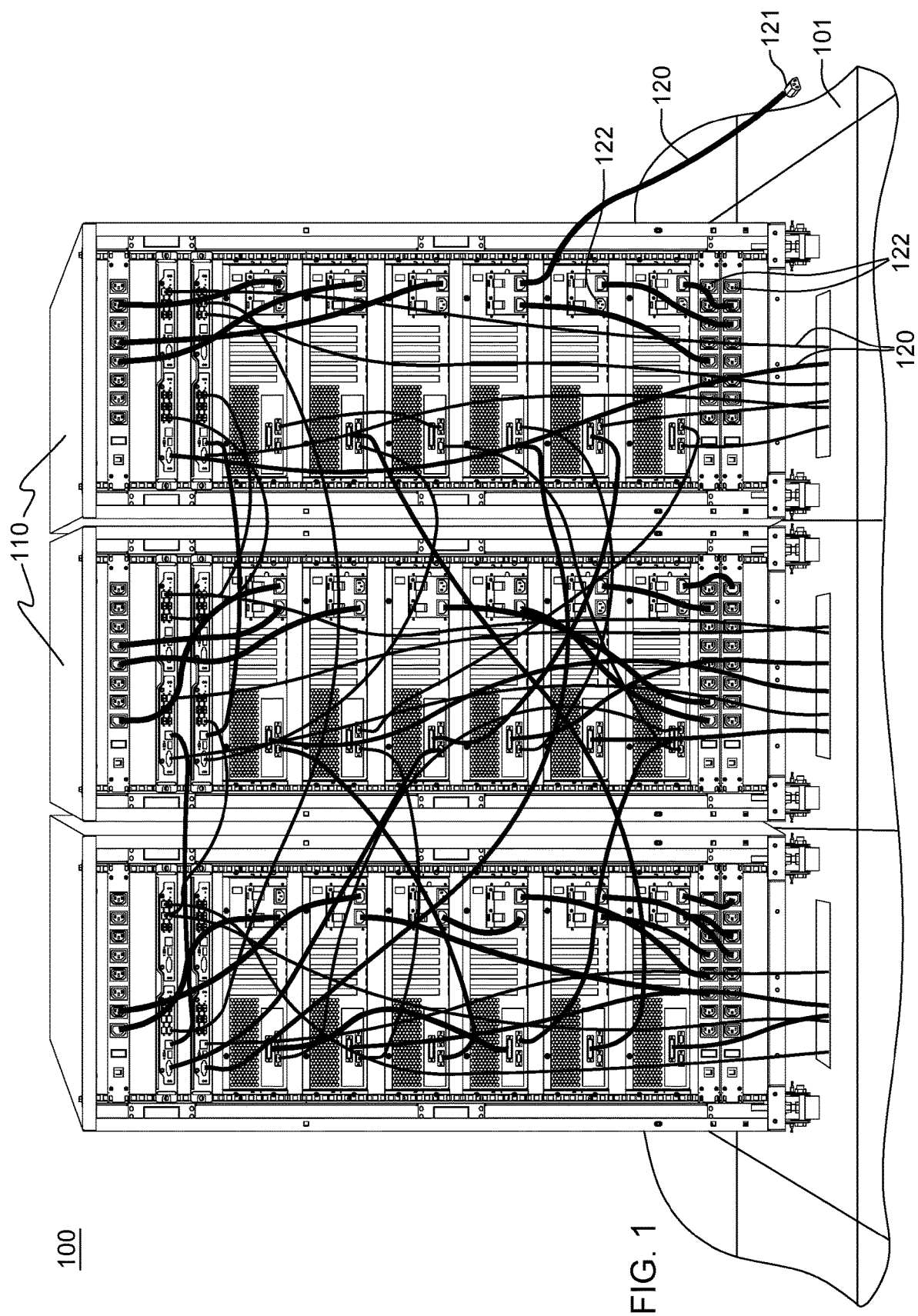
FIG. 1 depicts one embodiment of a network with a plurality of cables, and a cable connector to be plugged into the network for which guidance is to be provided, in accordance with one or more aspects of the present invention.

Aspects of the present invention and certain features, advantages and details thereof, are explained more fully below with reference to the non-limiting example(s) illustrated in the accompanying drawings. Descriptions of well-known systems, devices, processing techniques, etc., are omitted so as to not unnecessarily obscure the invention in detail. It should be understood, however, that the detailed description in this specific example(s), while indicating aspects of the invention, is given by way of illustration only, and not by way of limitation. Various substitutions, modifications, additions, and/or other arrangements, within the spirit and/or scope of the underlying inventive concepts will be apparent to those skilled in the art from this disclosure. Note further that numerous inventive aspects and features are disclosed herein, and unless inconsistent, each disclosed aspect or feature is combinable with any other disclosed aspect or feature as desired for a particular application to facilitate, for instance, providing a cable plugging guidance process, system and computer program product for a network.

The illustrative embodiments may be described below using specific code, designs, architectures, protocols, layouts, schematics, or tools only as examples, and are not limited to the illustrative embodiments. Furthermore, the illustrative embodiments may be described in certain instances using particular software, tools, and data processing environments only as example for clarity of description. The illustrative embodiments may be used in conjunction with other comparable or similarly purposed structures, systems, applications, or architectures. An illustrative embodiment may be implemented in hardware, software, or a combination thereof.

The examples in this disclosure are used only for clarity of description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed herein.

Networks, such as computer networks, communication networks, and other networks, typically rely on cables to connect product components of the network to one another. Within a network, a user may be required to plug a large number of cables, and even if a user knows where to plug a particular cable, there may be a number of similar cables that have been plugged at a first cable end, which would need to be traced back from a second cable end in order to ascertain which particular cable the user may be holding to determine where to plug the second cable end. Further, situations may exist where a cable is long enough that a user plugging one end of the cable may not be able to see the other end of the cable. For instance, cables may extend between the front and back of a rack, between racks, across a data center, or even span separate rooms of a data center facility, which may make tracing a particular cable difficult and time consuming.

Reference is made below to the drawings, which may not be drawn to scale for ease of understanding, wherein the same reference numbers used throughout different figures designate the same or similar components.

By way of example, FIG. 1 depicts one embodiment of a data center 100 with a plurality of racks 110 of computing equipment. In the example of FIG. 1, datacenter 100 is a raised floor data center, with the plurality of racks 110 residing on a raised floor 101 of data center 100. Note that FIG. 1 may represent a single network, or multiple interconnected networks. Note also that the phrase "network" is used broadly herein to refer to any computer, communications, etc., network or system with two or more product components interconnected by cables. The product components may be any of a variety of components, with a server rack of a data center being one example of a network, or a portion of a network, having a large number of cables to be plugged into components of the network to achieve a desired setup configuration. The cables may be, for instance, power cables, input/output cables, other communications cables, etc. Typically, a cable may have a first cable connector at a first end and a second cable connector at a second end. In the example of FIG. 1, multiple cables 120 are shown, each of which has an appropriate cable connector 121 at each end thereof. Further, the various components of the network are shown to have respective plug locations 122 for plugging appropriate cables into the network to interconnect components of the network in the desired configuration. Note also that although typically having a single first end and a single second end, a "cable" as used herein may include a configuration with multiple first ends and/or multiple second ends, each having associated therewith a respective cable connector to be plugged in the network (e.g., a Y-cable).

As can be understood from the depiction of FIG. 1, it may be a time-consuming process to determine for an individual cable 120 where a particular cable connector 121 at one end of the cable should be plugged into the network. This is true whether the other end has been plugged into the network, or not. Further, as noted, depending on where a first plug location is relative to a second plug location within the network, it may be difficult to ascertain where the appropriate plug location is for plugging a particular cable connector. For instance, as shown in FIG. 1, multiple cables may extend from one rack to other locations within the data center, and thus, where, or even whether, the other end of the cable is plugged may sometimes be difficult to ascertain.

Disclosed herein, in one or more aspects, are methods, systems and computer program products which guide cable plugging within a network using, for instance, wireless communication tags, such as near-field communication (NFC) tags, accompanying cable connectors at the ends of the cables to be plugged in the network. As is known, NFC tags employ a set of communication protocols that enable an electronic device, such as a mobile device, to establish communication by bringing the device and tag within a set distance of each other. For instance, in one or more implementations, NFC tags may operate at a frequency of 13.56 MHz, and have a read distance of 1-1.5 meters (ISO/IEC 15693), or less. Current NFC tags may have a maximum memory size of about 8 kB, and a maximum transfer rate of about 424 kB/s for reading or writing.

Note that although described hereinbelow with reference to NFC communications and NFC tags, near-field communication protocols are one example of a short range wireless communication protocol which may be employed as part of providing cable plugging guidance, in accordance with one or more aspects of the present invention. Those skilled in the art will understand that other short range wireless communication protocols could be employed, such as Bluetooth communications, short range Wi-Fi, radio frequency identification (RFID), etc.

In one or more aspects, providing cable plugging guidance as disclosed herein advantageously allows a user to avoid having to lookup instructions to know which cable plug should be placed into which plug location of a particular computing network, resulting in less training potentially being required for what is conventionally a difficult task. Further, using the processes disclosed herein, a user is freed of any need to trace a cable back to an opposite cable end that may already be plugged within the network in order to ascertain where a second cable end is to be plugged. In addition, the processes disclosed herein allow a user to avoid sending power or other signals through a cable to identify both ends of the cable in a case where the cable may run a long distance, such as between rooms. Further, the various process aspects disclosed herein free a user from having to plug a second cable connector of a cable immediately after plugging a first cable connector of the cable, since there is no concern for having multiple second cable connectors grouped together. This may speed up overall time required to complete the network plugging process, or allow a user to take breaks during the plugging process without risk of losing place. Further, the various aspects disclosed herein may allow multiple users to plug multiple cable ends substantially simultaneously. Also, the processes disclosed herein ensure proper plugging of cable connectors in a desired configuration prior to full turning on of the network setup (other than required to operate the processes disclosed herein). Still further, the various aspects disclosed herein are easy to use, even among components in geographically distinct locations. Using the cable plugging guidance facility disclosed herein, plugging errors may be reduced, and the time for setting up a network may be reduced. Further, in certain embodiments, cable entanglements may potentially be reduced using pre-saved, optimized routing guidance. Also, the facility disclosed herein could potentially reduce time required for a repair action.

The above-noted advantages, as well as other features and advantages of the invention, are realized through the provision, in one or more aspects, of a method of facilitating cable plugging in a network, which includes receiving, from a scanner associated with the network, wirelessly read connector identifying information from a tag accompanying a cable connector at one end of a cable to be plugged in the network. The connector identifying information is used, by a processor, to ascertain, from a database, applicable cable rules guidance for where to properly plug the cable connector in the network. Based on the guidance, the method includes illuminating one or more indicators associated with one or more plug locations in the network to assist in properly plugging the cable connector in the network.

In one or more implementations, the one or more plug locations may be located in one or more components of the network at a same geographic location where the wirelessly scanning occurs by the scanner. In one or more embodiments, the network may include multiple components interconnecting by one or more cables, and the multiple components may include multiple wireless scanners associated therewith capable of performing wireless scanning of the tag. The scanner may be one wireless scanner of the multiple wireless scanners.

In one or more implementations, the wirelessly read connector identifying information and the illuminating one or more plug locations may occur, at least in part, at different components of multiple components of the network, where the multiple components interconnect by one or more cables. In one or more other embodiments, the receiving, the using, and the illuminating may occur, at least in part, within a common component of multiple components of the network, the multiple components interconnecting by one or more cables.

In one or more embodiments, the method may further include sensing, via a proximity sensor, presence of the tag accompanying the cable connector at the one end of the cable near the scanner, and based on the sensing, initiating wirelessly reading, by the scanner, of the tag to obtain the connector identifying information. The proximity sensor may be associated with a component of the network that includes the scanner, and the component may be one component of multiple components of the network interconnecting by one or more cables.

In one or more embodiments, the tag is a passive tag, and the method includes wirelessly powering, by the scanner, the passive tag to read the connector identifying information from the tag. In one or more embodiments, the one or more indicators may include one or more light emitting diodes associated with the one or more plug locations. For instance, each plug location may have one or more light emitting diodes associated therewith.

In one or more implementations, the illuminating may be for a predefined period of time within which the cable connector may be properly plugged into a plug location of the one or more plug locations in the network. Further, in one or more embodiments, the cable connector may include a plug detect circuit associated therewith and the method may include detecting, via the plug detect circuit, proper plugging of the cable connector into a plug location of the one or more plug locations in the network. Based on the detecting, a log identifying which cable connectors are plugged into which plug locations may be updated. In one or more further embodiments, the method may include determining that the cable has not yet been plugged in the network, and based at least in part thereon, the cable rules guidance may be ascertained to minimize resultant cable tangling within the network.

Figure 2:
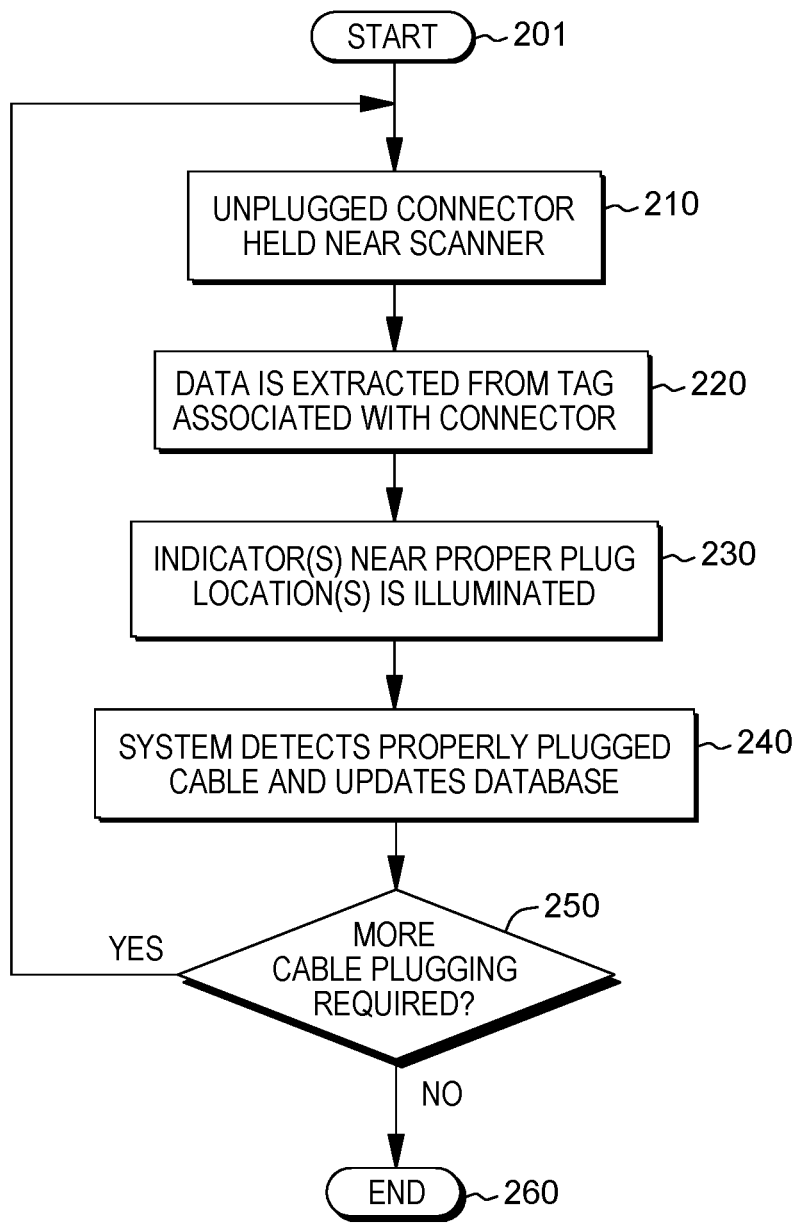
FIG. 2 depicts one embodiment of a process of facilitating cable plugging in a network, in accordance with one or more aspects of the present invention.

FIG. 2 depicts one embodiment of a process 200 for facilitating (or assisting) a user in proper cable plugging within a network, in accordance with one or more aspects of the present invention. As illustrated, process 200 begins 201 with an unplugged connector having an accompanying tag being held near a scanner associated with the network 210. Note that, in one or more implementations, the cable plugging guidance system or facility disclosed herein may be implemented within, or integrated within, the network, such as within one or more components of the network. Further, note that in one or more embodiments, the cable contains, or has associated therewith, tags, such as NFC tags, at the different ends of the cable. For instance, the tags may be incorporated into the cable connectors or physically attached to the cable connectors; that is, assuming that the attachment does not interfere with plugging of the cable connector at an intended plug location within the network. In one or more implementations, the tag might be a passive device, where the device effectively acts as a transponder. Therefore, the process may include powering up by the scanner the cable connector's associated tag. Once powered, data, and in particular, connector identifying information, may be extracted from the tag associated with the cable connector 220.

Using the connector identifying information obtained from the tag, pre-established plug rules for the desired network configuration may be referenced, such as from a plug rules database, by a processor of (or used by) the guidance system to ascertain guidance for where to properly plug the cable connector for the desired network configuration. Based on the guidance, one or more indicators associated with one or more plug locations in the network may be illuminated to assist a user in properly plugging the cable connector in the network 230. Proper plugging of the cable connector may be detected, and a plug log identifying which cable connectors are plugged into which plug locations may be updated 240. Processing may then determine whether more cable plugging is required 250, and if "yes", may return to await a user bringing a next cable connector tag near a scanner of the guidance system associated with the network. If "no", then processing is complete 260.

As noted, in one or more implementations, the methods, systems and/or computer program products disclosed herein may be integrated or implemented with the network as a system (or facility) which is assumed to be powered during the plugging of the cables discussed herein. In operation, a user may be plugging a plurality of cables and may hold one cable connector up to a scanner of the system, which wirelessly reads or scans the connector identifying information from the tag associated with the connector. The system also includes indicators, such as light emitting diodes (LEDs), associated with the different possible plug locations in the network capable of receiving a cable connector. Once the guidance is obtained, one or more of the indicators (e.g., LEDs) associated with the appropriate plug location(s) may be illuminated, such as by blinking and/or using a predefined color to draw or guide the user to the appropriate plug location.

Figure 3:
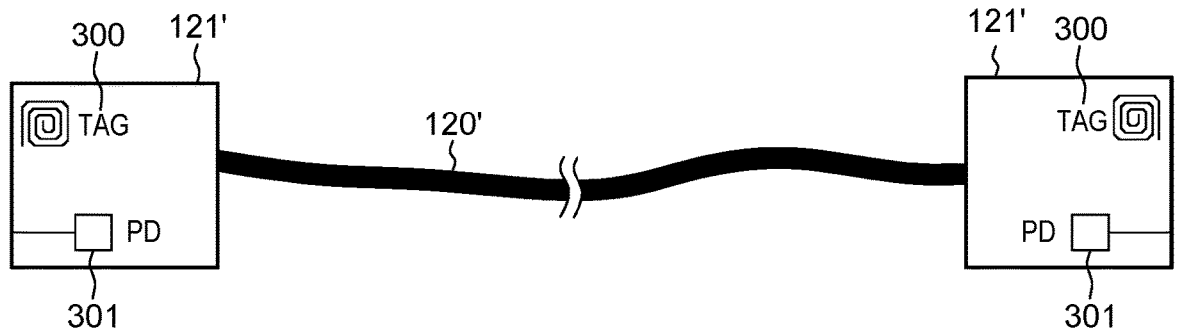
FIG. 3 depicts one embodiment of a cable to be plugged in a network using cable plugging guidance, in accordance with one or more aspects of the present invention.

FIG. 3 depicts one embodiment of a cable 120' with cable connectors 121' at opposite ends thereof, each of which has associated therewith a tag 300, as well as a plug detect circuit 301. In one or more implementations, the tag may be a near field communication (NFC) tag, and each cable connector at the opposite ends of the cable may have a respective NFC tag associated therewith, each containing appropriate information for that cable connector. The NFC tags may be shielded from the cables, and any circuitry inside the respective cable connectors, such that interference does not occur at NFC frequencies of 13.56 MHz, or NFC harmonics (e.g., 40.68 MHz for a third harmonic, or 67.80 MHz for a fifth harmonic). As noted, the tags may be built into the respective cable connectors, or associated in some way by being physically attached to the cable connectors. Where the tag is an NFC tag, the tag may be a passive NFC tag (as assumed above), in which case, the scanner may power the tag in order to read data from the tag. In the case where the tag is an active NFC tag, the tag can read and send information, making the tag effectively a transceiver. As noted initially, other wireless communication technologies may alternatively be employed. However, a proximity-based method such as NFC is advantageous in an environment where there may be tens or even hundreds of cables, and cable connectors to be plugged into the network may be in close proximity.

In one or more embodiments, the connector identifying information may be stored or programmed into the associated tag, and may include a variety of applicable data. By way of example only, the connector identifying information may include one or more of tag's (or connector's) unique identification (UID), the type of cable connector the tag is attached to, the type of cable the tag is attached to, a part number, a serial number, wire gage for the cable, a number of conductors, various cable connector attributes, cable length, electrical ratings, locations where the connector may be properly plugged in a network, the UID of one or more other connectors attached to the same cable, etc.

In one or more embodiments, to simplify the manufacturing process of the cable, UIDs may be assigned analogous to MAC addresses. Also, as noted, cable 120' may optionally contain a plug detect circuit 301 which may be implemented via, for instance, any continuity checking mechanism, such as a local wrap pin digital input output (DIO), a magnetic reed switch DIO, or similar approach known in the art.

Figure 4:
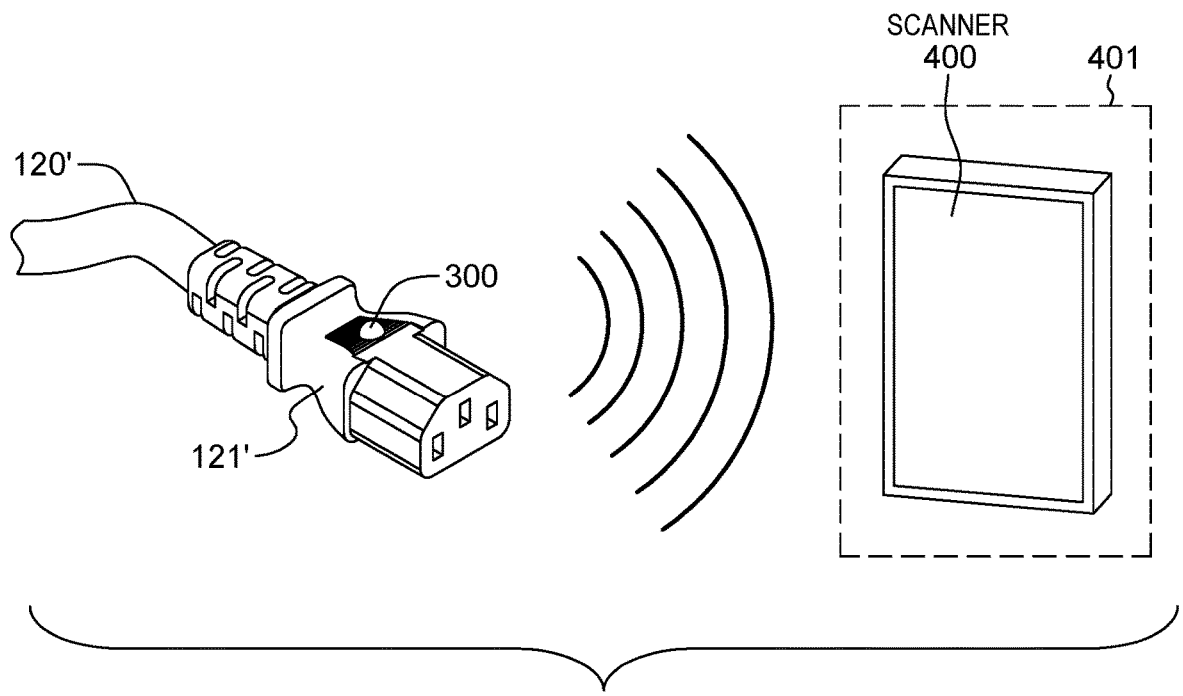
FIG. 4 depicts one embodiment of a scanner wirelessly reading connector identifying information from a tag accompanying a cable connector at one end of a cable to be plugged in a network, in accordance with one or more aspects of the present invention.

FIG. 4 depicts one embodiment of cable 120' with cable connector 121' and tag 300 at one end brought within wireless proximity to a scanner 400 of a component 401 of a network being setup, and into which the cable is to plug. In operation, in one or more embodiments, a user may bring cable connector 121' with tag 300 towards scanner 400, and an associated proximity sensor may detect the nearby cable connector, and wake up the scanner 400. Assuming that the tag 300 is a passive tag, scanner 400 may provide sufficient power to the tag 300 (i.e., the wireless communication device) on the cable connector such that the tag can transmit its stored connector identifying information. As noted, in one or more implementations, the connector identifying information may then be used to facilitate ascertaining appropriate cable rules guidance for where to properly plug the cable connector in the network by referencing, for instance, a cable rules database of the guidance system, which may be incorporated into one or more components of the network, or be accessible by the guidance system from the network. Based on the obtained plug rules guidance, one or more indicators associated with one or more plug locations in the network may be illuminated to assist in properly plugging the cable connector in the network. A more detailed embodiment of a component 401, with such indicators is depicted in FIG. 5.

Figure 5:
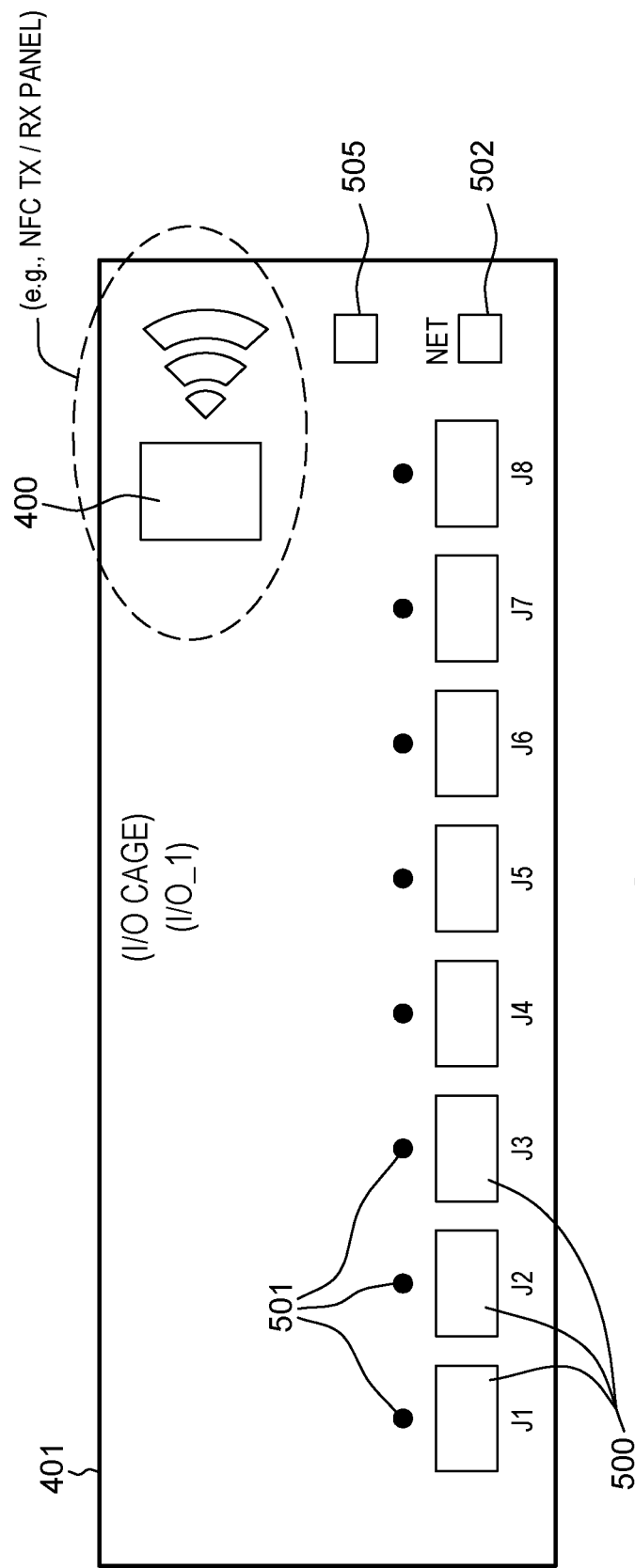
FIG. 5 depicts one embodiment of a component of a network with a cable plugging guidance system or facility incorporated therein, in accordance with one or more aspects of the present invention.

As noted, FIG. 5 illustrates one embodiment of a component 401 of a network being set up, and within which a cable may be plugged. In this embodiment, and by way of example only, component 401 is illustrated to be an input/output component (I/O_1) associated with an input/output cage (I/O cage) of a network being configured. As shown, component 401 includes or has associated therewith a guidance system which includes a scanner 400 and one or more indicators 501, such as one or more light emitting diodes, associated with one or more plug locations 500, each capable of receiving an appropriate cable connector. Further, a proximity sensor 505 may be associated with scanner 400, and one or more guidance system (net) connections 502 may be provided to interconnect (and/or power) the guidance system disclosed herein during setup of the network in the desired configuration.

As illustrated in the embodiment of FIG. 5, component 401 may have a plurality of plug locations 500 (e.g., J1-J8). Further, each plug location 500 may contain a corresponding plug detect connection or circuit, as well as one or more indicators 501, such as one or more light emitting diodes of the guidance system. Also, in one or more implementations, scanner 400 may be, or include, an NFC transceiver, and proximity sensor 505 may be provided near scanner 400 in order that scanner 400 not be actively pinging all the time to minimize radiated emissions, and save power. As an alternative to proximity sensor 505, a local activation button with associated timer code, could be provided for a user to wake up or activate the scanner for a timed duration. If multiple physical locations exist for the network, each of the physical locations may contain a communications connection, such that the guidance system across the different physical locations can communicate over a network (e.g., internet, intranet, etc.). For instance, one or more net communication connections 502 may be provided to interconnect (and/or power) the guidance system disclosed herein during setup of the network. Note, in this regard, that the facility disclosed assumes that there is at least system power available to power the guidance aspects disclosed herein during setup plugging of cables in the desired configuration within the network.

Figure 6:
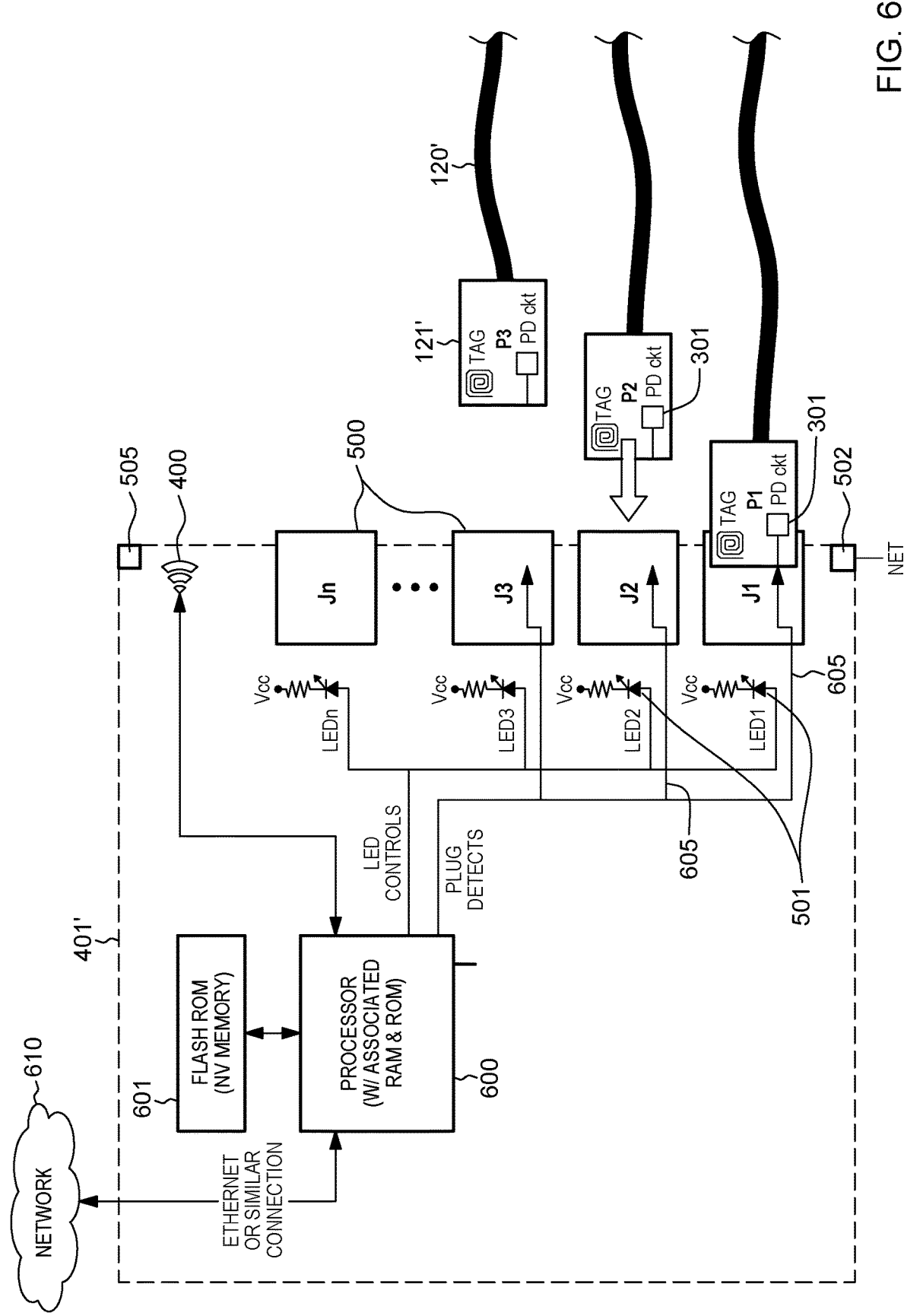
FIG. 6 depicts a more detailed embodiment of a component of a network with a cable plugging guidance system incorporated therein, in accordance with one or more aspects of the present invention.

FIG. 6 depicts a more detailed embodiment of a component 401' of a network to be setup, which incorporates a guidance system, such as disclosed herein. As illustrated, component 401' again includes multiple plug locations 500 (J1 . . . Jn), each of which has one or more indicators 501 (e.g., LED 1 . . . LED n) of the guidance system associated therewith. Plug locations 500 further include a plug detect connection or circuit 605 which communicatively connects with the plug detect circuit 301 of a respective plug connector 121' when properly plugged into plug location 500, as shown. Scanner 400, proximity sensor 505, and net connection 502 (such as described above) are also included within component 401' in the depicted example.

As shown, the guidance system may include or utilize, one or more processors 600, such as one or more microprocessors, with associated RAM and ROM memory. Processor 600 may access one or more local and/or remote databases with, for instance, cable plug rules, in order to ascertain the applicable cable rules guidance for a particular cable connector to be plugged into the network. For instance, the database could reside on non-volatile memory 601 (i.e., flash ROM) locally accessible by processor 600 within component 401', or could reside remotely, such as at a remote server across a communication network 610.

Communication network 610, which may connect to component 401' via the one or more guidance system (net) connections 502, may be any media used to provide communication links between various devices and computers connected together within a processing environment. For instance, network 610 may include connections, such as wires, wireless communication links, fiber optic cables, etc. In one or more embodiments, network 610 may utilize the Internet, or different type of network, such as an intranet, a local area network (LAN), a wide area network (WAN), a wireless network, etc. The database may contain plug rules for the desired network configuration, as well as, for instance, a plug log containing the current status of which plug locations have cables plugged therein, along with, for instance, information about the cable connector and/or cable at each location. The plug rules may be for the entire network, that is, for all physical locations of the network, or just for a portion of the network. In one or more embodiments, the plug rules may be stored in read-only memory, while the plug log (or status log) may be saved in a read or written to database (e.g., a from-to database).

Processor 600 may be utilized to monitor proximity sensor 505, obtain or receive read data from scanner 400, control illuminating indicator(s) 501 at each plug location 500, detect plug status via plug detects 605, 301, access plug rules and plug logs by reading/writing to memory, and communicate with other processes of the guidance system via communications network 610, depending on the implementation.

Processor 600 and non-volatile memory 601 may often be required for other controls within the network component, such as for a central processing unit, an I/O device, or other devices of the network. The guidance system disclosed herein could utilize one or more of the existing processing capabilities within component 401' at minimal extra cost, that is, such as needed to wire in scanner 400, proximity sensor 505, indicators 501, and plug detect circuitry 605.

In general, in one or more embodiments, the plug guidance disclosed herein may be provided by illuminating an indicator, such as an LED, near a plug location where the guidance facility has determined, based on the obtained applicable cable rule guidance, that a particular cable connector should properly plug for the desired network configuration. In operation, if a cable has already been plugged at one end, that information will also be read from the database, that is, the plug log database, and the corresponding plug location for the other end of the cable may be illuminated. If neither end of the cable has been plugged, then multiple locations within the component, or within multiple components of the network, could be illuminated (if appropriate) so that the user may select which plug location to plug the cable connector into. Alternatively, if neither end of the cable has been plugged, a most ideal location into which to plug the connector cable may be illuminated, for instance, in order to minimize resultant cable tangling within the network. This information could also be stored (in one or more embodiments) within the plug rules database that is available locally or remotely to the processor.

Figure 7A:
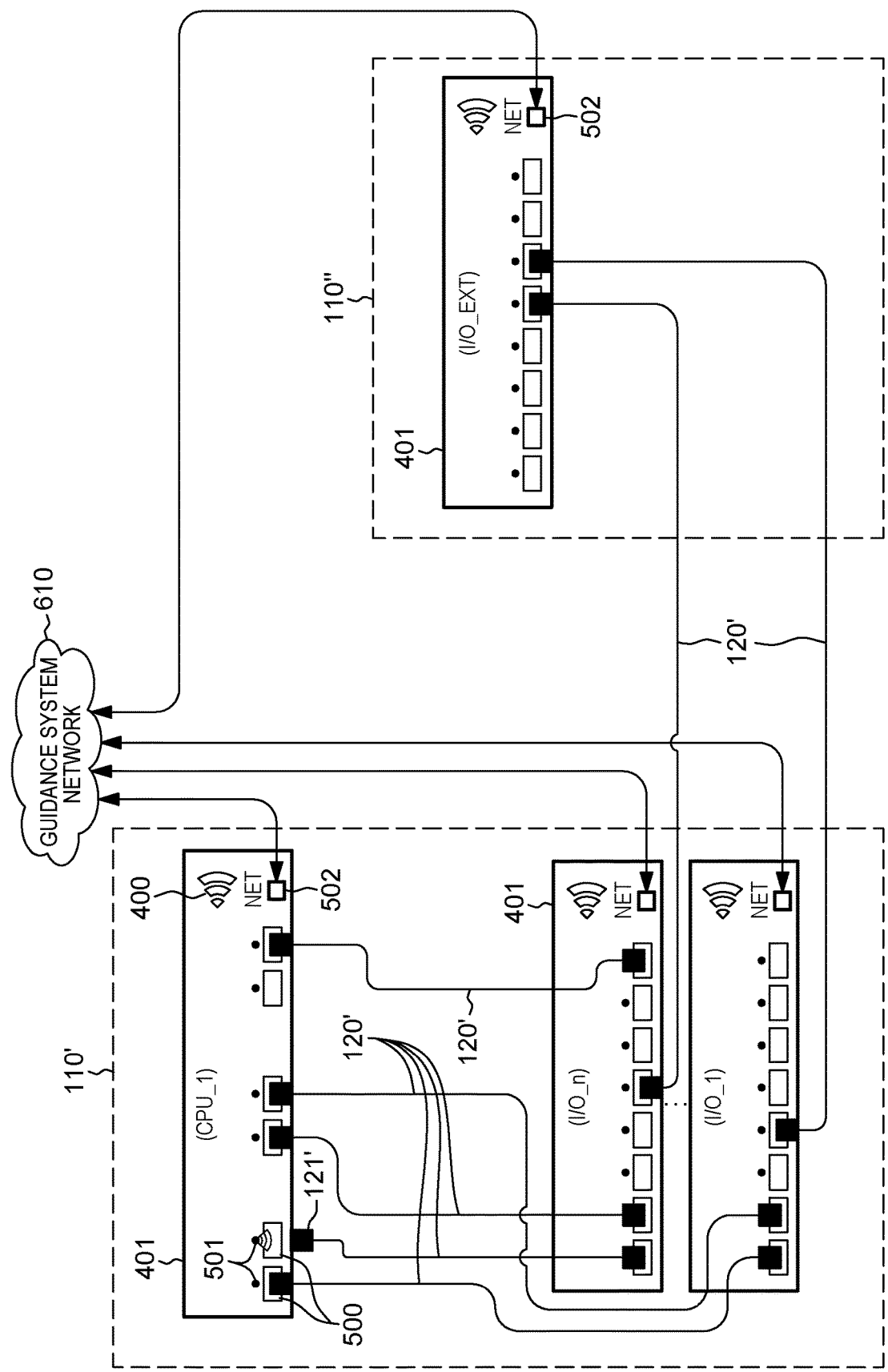
FIG. 7A depicts one embodiment of a network with multiple components and a cable plugging guidance system incorporated therein, in accordance with one or more aspects of the present invention.

FIG. 7A depicts a more detailed embodiment of a network having integrated therewith a guidance system (or facility) such as disclosed herein. In this embodiment, multiple components 401 are disposed in separate computer racks 110', 110", with each component 401 including one or more net connections 502 to a guidance system network 610. For instance, network 610 may facilitate accessing remotely stored information, such as information in a remote database of plug rules, and/or a remote database maintained plug log for the different components within the network. Note that network 610 also allows for processing within the guidance system in different components 401 of the network being configured to communicate in accordance with the guidance processes disclosed herein. For instance, a cable connector may be scanned at one scanner of one component in the network, and the plug location may be located at a different component in the network, with the guidance system illuminating the indicator associated with the plug location in the different component to provide the user with the appropriate guidance.

In the implementation example of FIG. 7A, each component 401 includes multiple plug locations 500, each having one or more associated indicators 501 which may be illuminated by the guidance system based on the ascertained cable rule guidance for a particular connector cable. As one embodiment only, multiple components 401 (such as CPU_1, and I/O_1-I/O_n) reside in computer rack 110' at a first physical location, and one or more components (e.g., I/O_EXT) may exist in a second rack 110" at a second physical location. The second physical location may be within the same datacenter as the first, or in another room of a common facility, or in a completely separate geographic location. In one or more embodiments, when a user scans a cable connector at one of the available scanners 400 of a component 401 at, for instance, a first location, one or more processors within the guidance system may be activated such that, for instance, any plug location at the first physical location may be illuminated, and not only a plug location on the particular component with the scanner used to wirelessly read the cable connector. In one or more embodiments, the databases, including the cable rules database and the plug log database, may be distributed, such as across the components of the network, with only databases that are affected by a most recent plugging action needing to be updated. For instance, if a cable is being plugged between components CPU_1 and I/O_1, then only the local databases on those two components may need to be updated. Components I/O_2 through I/O_N and I/O_EXT may choose not to update their databases for that specific cable.

FIG. 7B depicts an alternate embodiment of a cable plugging guidance system, in accordance with one or more aspects of the present invention. In FIG. 7B, a first component 401a and a second component 401b of a network being configured with interconnecting cables 120' are illustrated. Each component 401a, 401b may be similar to components 401, 401' described above. In this configuration, a centralized database 700 may be provided for the plug guidance facility, rather than having individual databases for each component in the network. Centralized database 700 may include, in one or more embodiments, both the cable rules database, as well as the plug log identifying which cable connectors are plugged into which plug locations in the network. Note that the components 401a, 401b may be located in separate geographic locations, and thus, a scanner 400 may be associated with each component. The central database 700 in component 401a may be updated any time a proper plugging action is detected on either component 401a, or component 401b. In one or more implementations, centralized database 700 (e.g., an EPROM chip in a card (such as a Power™ card or Flexible Service Processor (FSP) for an International Business Machines Corporation System)) may be located on one of the components, and be accessed or updated via a network link when a proper plugging is detected anywhere in the network. By way of specific example, the Power card may be where database processing occurs, and the FSP may be a card for a Server Computer, I/O or Processor system or drawer that acts as a communication hub of the Service Control Network. There may be two types of networks in the Server Computer, that is, a data network which manages real data traffic, and a service control network that provides diagnostics, initialization, configuration (in this case, plug rules), runtime error detection, and correction for a server. Upon cable plug, the service communication may occur through FSP to the Power card that will contain Power firmware to perform plug rule analytics such as described herein.

Figure 8:
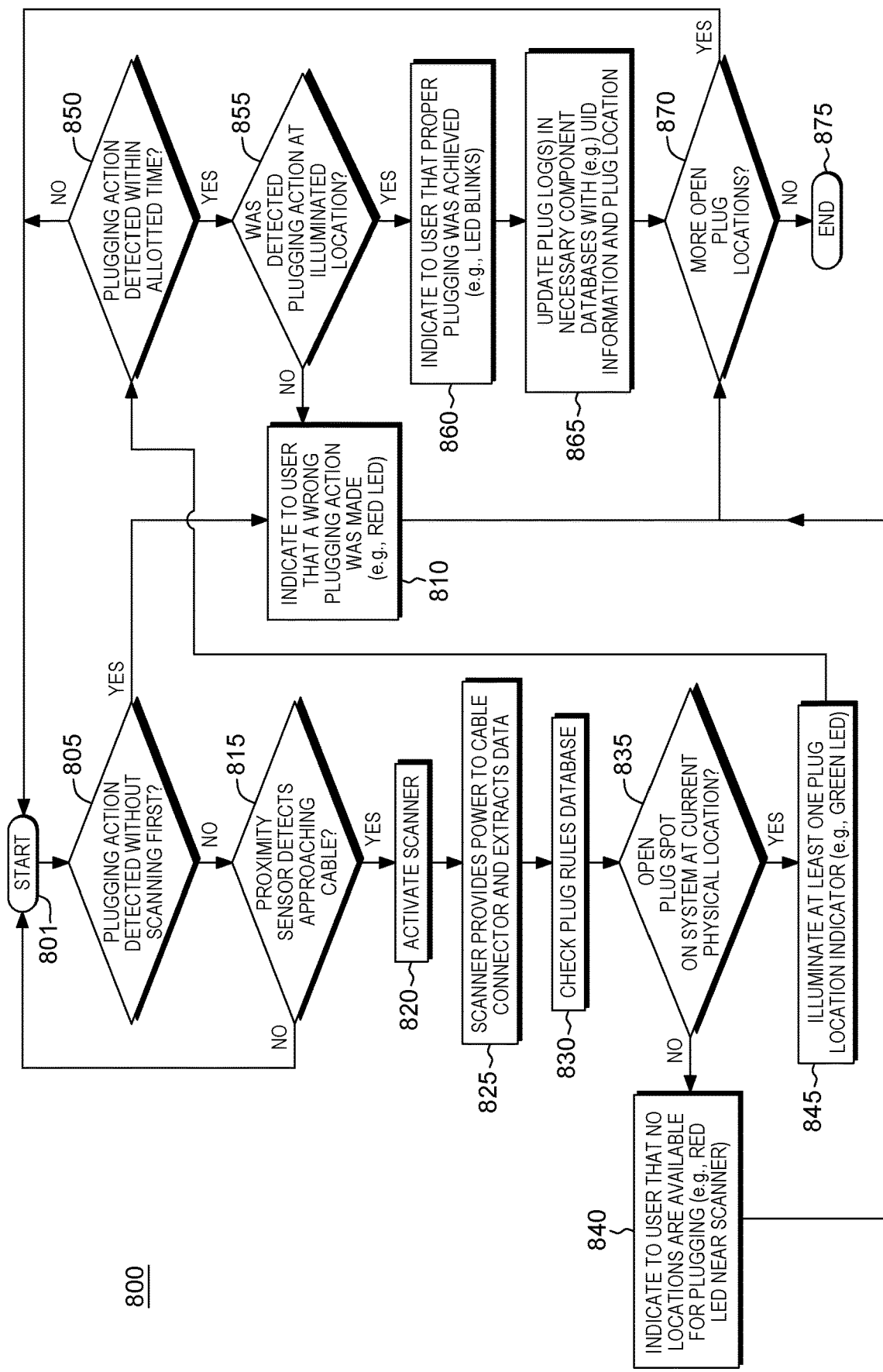
FIG. 8 depicts a further embodiment of a process of facilitating cable plugging in a network, in accordance with one or more aspects of the present invention.

FIG. 8 depicts a more detailed embodiment of a process of facilitating cable plugging in a network, in accordance with one or more aspects of the present invention. The depicted process 800 beings 801, for instance, with determining whether a plugging action is detected without a user first scanning the tag associated with the cable connector 805. If "yes", then an appropriate warning notification 810 may be provided. For instance, in one or more embodiments, an indicator such as a light emitting diode, may be illuminated a certain color, such as red. Thereafter, processing determines whether there are any more plug locations in the network that are open 870, and if "yes", returns to the start of processing 801, requiring the user to scan or rescan a cable connector prior to plugging.

Assuming that a cable connector has not been improperly plugged, then processing determines whether a proximity sensor detects an approaching cable 815. If "no", then processing remains at the start 801. As a user brings a cable connector, and the associated tag, towards a wireless scanner of the guidance system, the proximity sensor, in one or more embodiments, identifies the approaching tag and activates the associated wireless scanner 820. Assuming that the tag is a passive tag, the scanner may wirelessly power the tag so that the tag can transmit its stored connector identifying information 825. The connector identifying information is analyzed, for instance, by the processor, and a database is accessed to ascertain applicable cable rules guidance for where to properly plug the cable connector in the network 830. Processing determines whether there is an open plug location in the network at the user's current physical location 835. If "no", then an indicator may be illuminated to indicate to the user that there are no plug locations available for plugging the particular cable connector at the current location (e.g., a red LED light may be lit near the scanner) 840. Thereafter, processing determines whether there are any more open plug locations in the network 870, and if "yes", returns to the start of processing 801, requiring the user to scan a new cable connector prior to plugging. If there are one or more available plug locations at the current geographic location, processing may illuminate a selected plug location using one or more indicators associated with that plug location(s) 845. For instance, one or more light emitting diodes may be illuminated green at the appropriate plug location(s) in the component or another component at the current geographic location. Optionally, an indicator may be provided to suggest to the user to plug another cable first into the network to, for instance, improve resultant cable routing for the network.

Processing determines whether a proper plugging action is detected within an allotted time 850. For instance, an indicator, such as an LED, may remain illuminated for a pre-determined duration of time (e.g., 30 seconds), within which the system anticipates the user plugging the cable connector. As noted, a plug detect may exist at each plug location, which may be a circuit that is completed by the connector cable, a physical switch that is activated when a user plugs the connector cable into the plug location, a magnetic reed switch, a capacitor sensor, etc. Assuming a plugging action is detected, processing determines whether the detected plugging action is at the proper, illuminated plug location 855. If "no", then an appropriate indicator is provided to the user that an incorrect plugging action was detected 810. Thereafter, processing determines whether there are any more open plug locations in the network 870, and if "yes", returns to the start of processing 801, requiring the user to rescan the cable connector prior to plugging. Assuming that a proper plugging action is detected at the correct plug location, then the user may be provided with an indication that proper plugging was achieved 860. The plug log may be updated on any necessary component databases with, for instance, the UID information and the plug location 865. Processing then determines whether there are any more open plug locations 870 and "yes", returns to await the user bringing another connector into proximity of a scanner of the guidance system. Otherwise, processing is complete 875.

In one or more implementations, if a plugging action is detected at a plug location that is not illuminated (either because the user did not complete the plugging action within a predefined duration of time, the user did not scan the cable connector prior to plugging, or the user plugged the cable connector into the wrong plug location instead of a currently illuminated plug location), the errand plug location may be illuminated by a different color indicator, such as by a red LED indicator. In one or more embodiments, a red LED may remain lit indefinitely until a user removes the cable that is plugged into the improper plug location. Further, and as noted, if a user completes a plugging action properly within the defined duration of time, the user may receive an indication that the plugging action was completed properly, for instance, a green LED may blink. This may help to minimize error in cable plugging where the user did not fully insert the cable connector. A completed plugging action may be detected by the processor, which will update the plug log in the database by storing the data from the newly plugged cable connector, and the associated plug location. This allows the system data to be updated and allows the guidance system to know where the other end of the cable should be plugged to comply with stored plug rules for the desired network configuration.

Exemplary embodiments of a computing environment which may implement one or more aspects of the present invention are described below with reference to FIGS. 9-11.

Figure 9:
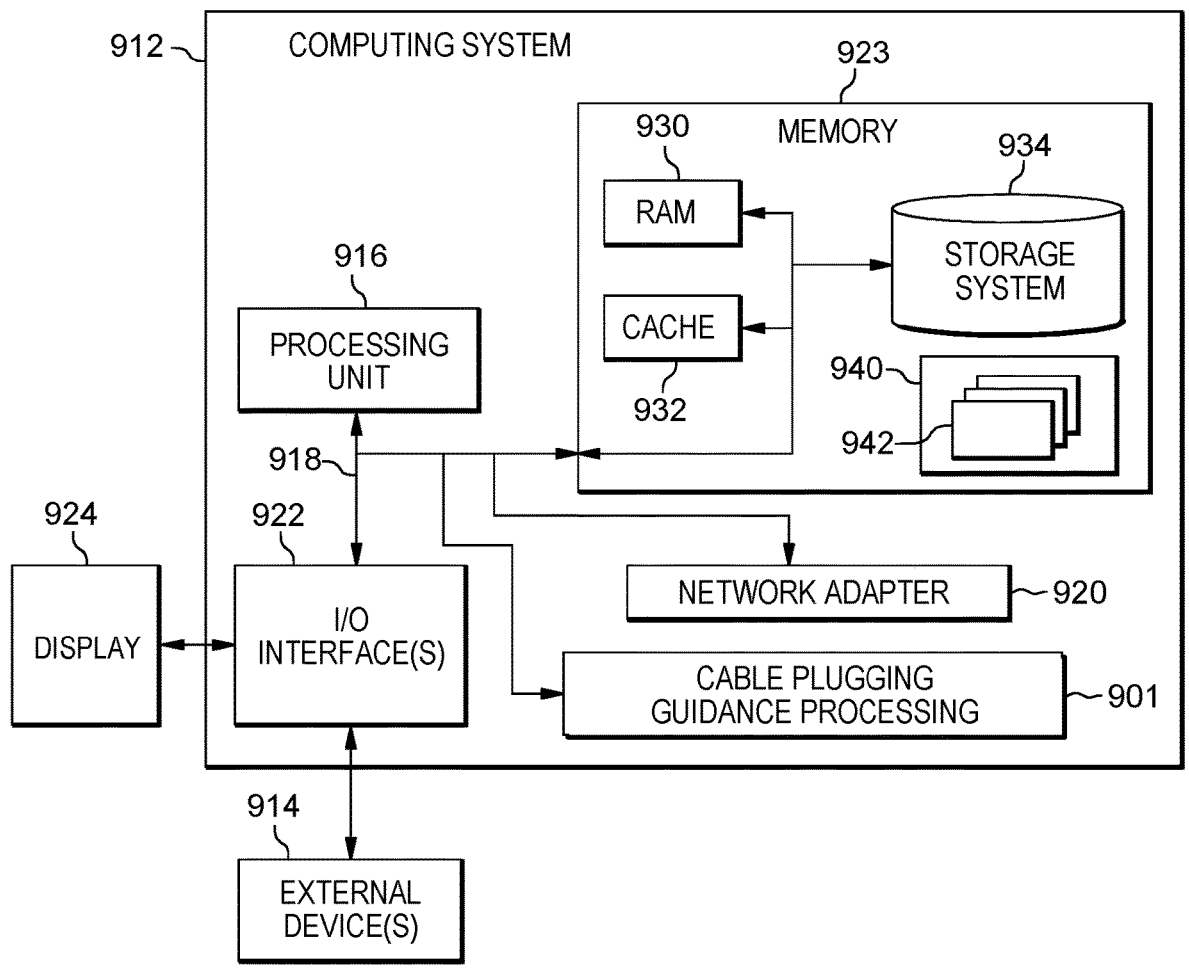
FIG. 9 depicts one embodiment of a computing system which may implement or facilitate implementing cable plugging guidance processing, in accordance with one or more aspects of the present invention.

By way of further example, FIG. 9 depicts one embodiment of a computing environment 900, which includes a computing system 912. Examples of well-known computing systems, environments, and/or configurations that may be suitable for use with computer system 912 include, but are not limited to, a server, a desktop computer, a work station, a mobile device, such as a wireless computer, a handheld or laptop computer or device, a mobile phone, a programmable consumer electronic device, a tablet, a personal digital assistant (PDA), or the like.

Computing system 912 may be described in the general context of computer system-executable instructions, such as program modules, being executed by a computer system. Generally, program modules may include routines, programs, objects, components, logic, data structures, and so on that perform particular tasks or implement particular abstract data types.

As depicted in FIG. 9, computing system 912, is shown in the form of a general-purpose computing device. The components of computing system 912 may include, but are not limited to, one or more processors or processing units 916, a system memory 923, and a bus 918 that couples various system components including system memory 923 to processor 916.

In one embodiment, processor 916 may be based on the z/Architecture® offered by International Business Machines Corporation, or other architectures offered by International Business Machines Corporation or other companies. z/Architecture® is a registered trademark of International Business Machines Corporation, Armonk, N.Y., USA. One embodiment of the z/Architecture® is described in "z/Architecture® Principles of Operation," IBM Publication No. SA22-7832-10, March 2015, which is hereby incorporated herein by reference in its entirety.

In other examples, it may be based on other architectures, such as the Power Architecture offered by International Business Machines Corporation. One embodiment of the Power Architecture is described in "Power ISA™ Version 2.07B," International Business Machines Corporation, Apr. 9, 2015, which is hereby incorporated herein by reference in its entirety. POWER ARCHITECTURE is a registered trademark of International Business Machines Corporation, Armonk, N.Y., USA. Other names used herein may be registered trademarks, trademarks, or product names of International Business Machines Corporation or other companies.

Bus 918 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computing system 912 may include a variety of computer system readable media. Such media may be any available media that is accessible by computing system 912, and it includes both volatile and non-volatile media, removable and non-removable media.

System memory 923 can include computer system readable media in the form of volatile memory, such as random access memory (RAM) 930 and/or cache memory 932. Computing system 912 may further include other removable/non-removable, volatile/non-volatile computer system storage media. By way of example only, storage system 934 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media could be provided. In such instances, each can be connected to bus 918 by one or more data media interfaces. As described below, memory 893 may include at least one program product having a set (e.g., at least one) of program modules that are configured to carry out the functions of embodiments of the invention.

Program/utility 940, having a set (at least one) of program modules 942, may be stored in memory 923 by way of example, and not limitation, as well as an operating system, one or more application programs, other program modules, and program data. Each of the operating system, one or more application programs, other program modules, and program data or some combination thereof, may include an implementation of a networking environment. Program modules 942 generally carry out the functions and/or methodologies of embodiments of the invention as described herein. Alternatively, a separate cable plugging guidance processing system, module, logic, etc., 901 may be provided within computing environment 912.

Computing system 912 may also communicate with one or more external devices 914 such as a keyboard, a pointing device, a display 924, etc.; one or more devices that enable a user to interact with computing system 912; and/or any devices (e.g., network card, modem, etc.) that enable computing system 912 to communicate with one or more other computing devices. Such communication can occur via Input/Output (I/O) interfaces 922. Still yet, computing system 912 can communicate with one or more networks such as a local area network (LAN), a general wide area network (WAN), and/or a public network (e.g., the Internet) via network adapter 920. As depicted, network adapter 920 communicates with the other components of computing system, 912, via bus 918. It should be understood that although not shown, other hardware and/or software components could be used in conjunction with computing system 912. Examples, include, but are not limited to: microcode, device drivers, redundant processing units, external disk drive arrays, RAID systems, tape drives, and data archival storage systems, etc.

One or more aspects may relate to or use cloud computing.

It is understood in advance that although this disclosure includes a detailed description on cloud computing, implementation of certain teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

A cloud computing node may include a computer system/server, such as the one depicted in FIG. 9. Computing system 912 of FIG. 9 may be practiced in distributed cloud computing environments where tasks are performed by remote processing devices that are linked through a communications network. In a distributed cloud computing environment, program modules may be located in both local and remote computer system storage media including memory storage devices. Computing system 912 is capable of being implemented and/or performing any of the functionality set forth hereinabove.

Figure 10:
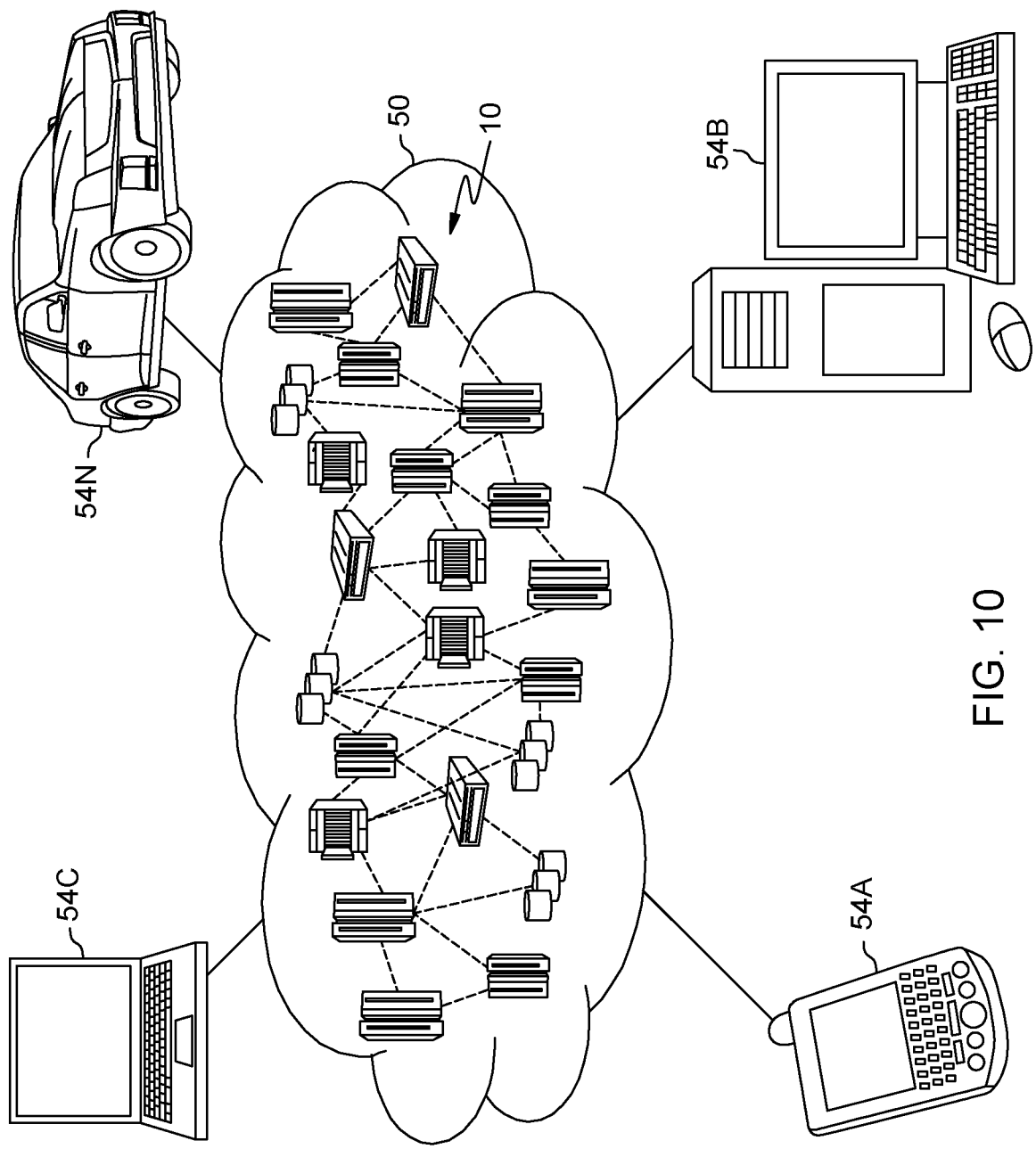
FIG. 10 depicts one embodiment of a cloud computing environment, which may implement, or be used in association with one or more aspects of the present invention.

Referring now to FIG. 10, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 11:
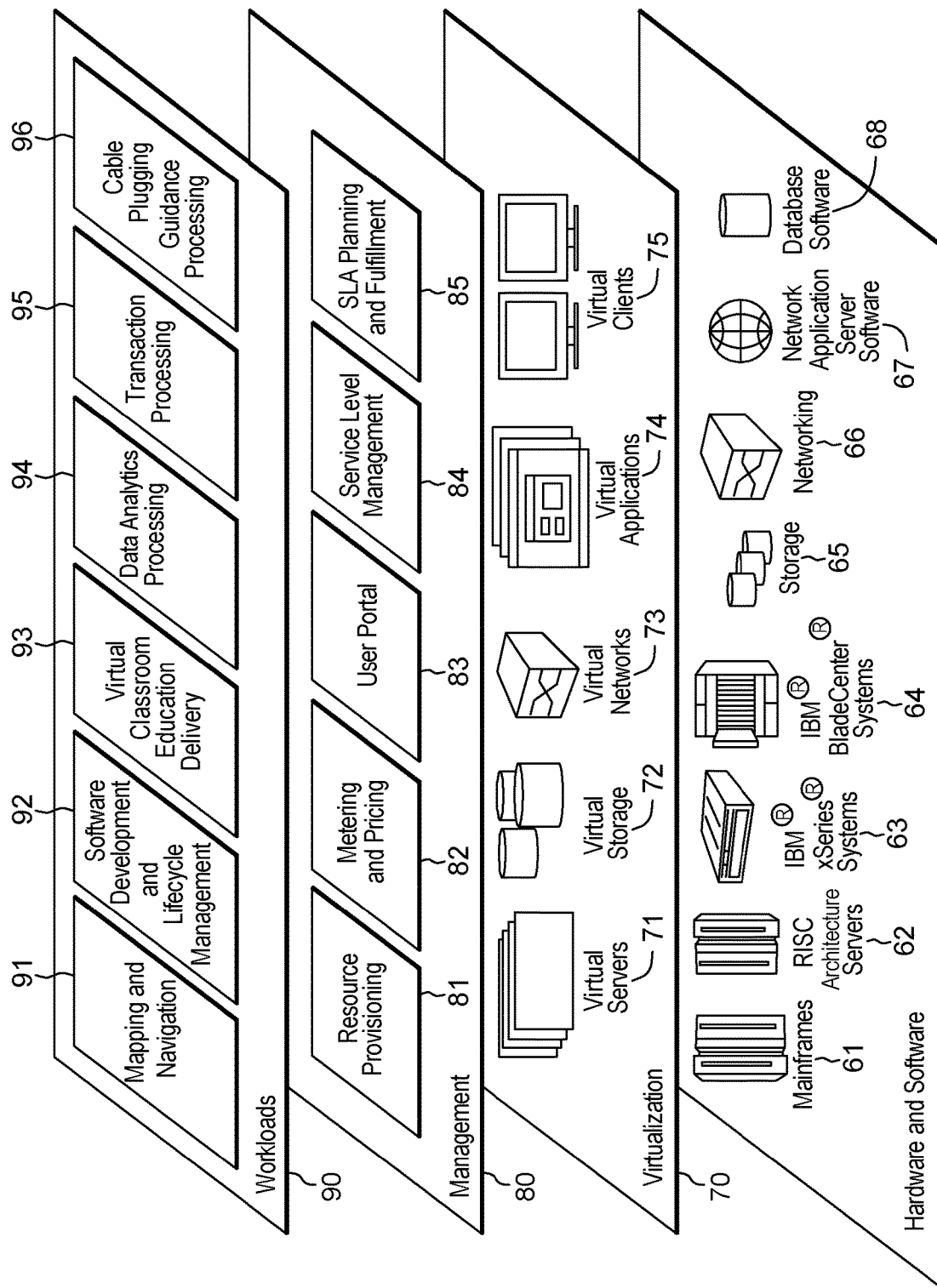
FIG. 11 depicts one example of abstraction model layers, which may facilitate or implement cable plugging guidance processing, in accordance with one or more aspects of the present invention.

Referring to FIG. 11, a set of functional abstraction layers provided by cloud computing environment 50 (FIG. 10) is shown. It should be understood in advance that the components, layers, and functions shown in FIG. 11 are intended to be illustrative only and embodiments of the invention are not limited thereto. As depicted, the following layers and corresponding functions are provided:

Hardware and software layer 60 includes hardware and software components. Examples of hardware components include mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and cable plugging guidance processing 96.

The descriptions of the various embodiments of the present invention have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments. Further, different instructions, instruction formats, instruction fields and/or instruction values may be used. Many variations are possible.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form contain, such as "contains" and "containing") are open-ended linking verbs. As a result, a method or device that "comprises", "has", "includes" or "contains" one or more steps or elements possesses those one or more steps or elements, but is not limited to possessing only those one or more steps or elements. Likewise, a step of a method or an element of a device that "comprises", "has", "includes" or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of one or more aspects of the invention and the practical application, and to enable others of ordinary skill in the art to understand one or more aspects of the invention for various embodiments with various modifications as are suited to the particular use contemplated.

What is claimed is:

1. A method of facilitating cable plugging in a network, the method comprising:
sensing, via a proximity sensor associated with the network, presence of a tag accompanying a cable connector at one end of a cable being near a scanner associated with the network, the cable to be plugged in the network;
based on the sensing, initiating wireless reading, by the scanner, the tag to obtain wirelessly read connector identifying information from the tag accompanying the cable connector at the one end of the cable to be plugged in the network, the connector identifying information comprising identifying information specific to the cable connector at the one end of the cable;
using, by a processor, the connector identifying information to ascertain, from a database, applicable cable rules guidance for where to properly plug the cable connector in the network; and
based the guidance, illuminating one or more indicators associated with one or more plug locations in the network to assist in properly plugging the cable connector in the network.

2. The method of claim 1, wherein the one or more plug locations are located in one or more components of the network at a same geographic location where wireless reading of the connector identifying information occurs.

3. The method of claim 1, wherein the network comprises multiple components interconnecting by one or more cables, the multiple components comprising multiple wireless scanners associated therewith capable of performing wireless scanning of the tag, the scanner being one wireless scanner of the multiple wireless scanners.

4. The method of claim 1, wherein the receiving, the using, and the illuminating occur, at least in part, within a common component of multiple components of the network, the multiple components interconnecting by one or more cables.

5. The method of claim 1, wherein the wirelessly read connector identifying information and the illuminating one or more plug locations occur, at least in part, at different components of multiple components of the network, the multiple components interconnecting by one or more cables.

6. The method of claim 1, wherein the proximity sensor is associated with a component of the network comprising the scanner, the component being one component of multiple components of the network interconnecting by one or more cables.

7. The method of claim 1, wherein the tag is a passive tag, and the method further comprises wirelessly powering by the scanner the passive tag to read the connector identifying information from the passive tag.

8. The method of claim 1, wherein the one or more indicators comprise one or more light emitting diodes associated with the one or more plug locations in the network.

9. The method of claim 1, wherein the illuminating is for a predefined period of time within which the cable connector may be properly plugged into a plug location of the one or more plug locations.

10. The method of claim 1, wherein the cable connector further comprises a plug detect circuit associated therewith, and the method further comprises detecting, via the plug detect circuit, proper plugging of the cable connector in a plug location of the one or more plug locations in the network.

11. The method of claim 10, further comprising updating, based on the detecting, a log identifying which cable connectors are plugged into which plug locations.

12. The method of claim 1, further comprising determining that the cable has not been plugged into the network as yet, and based at least in part thereon, the cable rules guidance is ascertained to minimize resultant cable tangling within the network.

13. A system of facilitating cable plugging in a network, the system comprising:
a memory; and
a processor communicatively coupled to the memory, wherein the system performs a method comprising:
sensing, via a proximity sensor associated with the network, presence of a tag accompanying a cable connector at one end of a cable being near a scanner associated with the network, the cable to be plugged in the network;
based on the sensing, initiating wireless reading, by the scanner, the tag to obtain wirelessly read connector identifying information from the tag accompanying the cable connector at the one end of the cable to be plugged in the network, the connector identifying information comprising identifying information specific to the cable connector at the one end of the cable;
using the connector identifying information to ascertain, from a database, applicable cable rules guidance for where to properly plug the cable connector in the network; and
based on ascertaining the guidance, illuminating one or more indicators associated with one or more plug locations in the network to assist in properly plugging the cable connector in the network.

14. The system of claim 13, wherein the network comprises multiple components interconnecting by one or more cables, the multiple components comprising multiple wireless scanners associated therewith capable of performing wireless scanning of the tag, the scanner being one wireless scanner of the multiple wireless scanners.

15. The system of claim 13, wherein the receiving, the using, and the illuminating occur, at least in part, within a common component of multiple components of the network, the multiple components interconnecting by one or more cables.

16. The system of claim 13, wherein the wirelessly read connector identifying information and the illuminating one or more plug locations occur, at least in part, at different components of multiple components of the network, the multiple components interconnecting by one or more cables.

17. The system of claim 13, wherein the proximity sensor is associated with a component of the network comprising the scanner, the component being one component of multiple components of the network interconnecting by one or more cables.

18. The system of claim 13, wherein the tag is a passive tag, and the method further comprises wirelessly powering by the scanner the passive tag to read the connector identifying information from the passive tag.

19. The system of claim 13, wherein the one or more indicators comprise one or more light emitting diodes associated with the one or more plug locations in the network.

20. A computer program product for facilitating cable plugging in a network, the computer program product comprising:
   a computer readable storage medium having program instructions embodied therewith, the program instructions being executable by a processor to cause the processor to:
   sense, via a proximity sensor associated with the network, presence of a tag accompanying a cable connector at one end of a cable being near a scanner associated with the network, the cable to be plugged in the network;
   based on the sensing, initiate wireless reading, by the scanner, the tag to obtain wirelessly read connector identifying information from the tag accompanying the cable connector at the one end of the cable to be plugged in the network, the connector identifying information comprising identifying information specific to the cable connector at the one end of the cable;
   use the connector identifying information to ascertain, from a database, applicable cable rules guidance for where to properly plug the cable connector in the network; and
   based on ascertaining the guidance, illuminate one or more indicators associated with one or more plug locations in the network to assist in properly plugging the cable connector in the network.

* * * * *